United States Patent [19]

Kanda

[11] Patent Number: 5,489,086

[45] Date of Patent: Feb. 6, 1996

[54] CYLINDRICAL ELASTIC MOUNT CONTAINING HIGHLY VISCOUS FLUID AND HAVING FLUID INJECTING INLET

[75] Inventor: Ryouji Kanda, Komaki, Japan

[73] Assignee: Tokai Rubber Industries, Ltd., Japan

[21] Appl. No.: 298,276

[22] Filed: Aug. 31, 1994

[30] Foreign Application Priority Data

Sep. 3, 1993 [JP] Japan .................. 5-219761

[51] Int. Cl.⁶ .............................. F16F 1/36; F16M 13/00
[52] U.S. Cl. ........................ 267/140.12; 267/219
[58] Field of Search ................... 267/140.12, 140.13, 267/141.2–141.4, 219; 248/562; 180/300, 312

[56] References Cited

U.S. PATENT DOCUMENTS

| | | | |
|---|---|---|---|
| 4,605,207 | 8/1986 | Konishi | 267/140.12 |
| 4,840,357 | 6/1987 | Jouade | 267/140.12 |
| 4,883,260 | 11/1989 | Kanda | 267/140.12 |
| 4,893,799 | 1/1990 | de Fontenay | 267/140.14 |

FOREIGN PATENT DOCUMENTS

| | | | |
|---|---|---|---|
| 0392909 | 10/1990 | European Pat. Off. . | |
| 4031114 | 4/1991 | Germany | 267/219 |
| 4140854 | 7/1992 | Germany | 267/140.12 |
| 60-256637 | 12/1985 | Japan . | |
| 63-149442 | 6/1988 | Japan . | |
| 2-38729 | 2/1990 | Japan . | |
| 3-134335 | 6/1991 | Japan . | |
| 5-47733 | 7/1993 | Japan . | |

OTHER PUBLICATIONS

Patent Abstracts of Japan, vol. 12, No. 409 (M–758)(3256) 28 Oct. 1988 & JP–A–63 149 442 (Kinugawa Rubber Ind Co Ind) 22 Jun. 1988.
Patent Abstracts of Japan, vol. 12, No. 378 (M–751)(3225) 11 Oct. 1988 & JP–A–63 130 944 (Tokai Rubber Ind Ltd) 3 Jun. 1988.

*Primary Examiner*—Robert J. Oberleitner
*Assistant Examiner*—Chris Schwartz
*Attorney, Agent, or Firm*—Parkhurst Wendel & Rossi

[57] ABSTRACT

A fluid-filled cylindrical elastic mount which includes radially spaced-apart inner and outer sleeves, and an elastic body interposed between the inner and outer sleeves for elastical connection thereof. The elastic body has diametrically opposite fluid chambers containing a highly viscous fluid, and at least one fluid passage which communicates with the fluid chambers. The outer sleeve has at least one inlet through which the highly viscous fluid is injected into the mount. Each of the inlets is formed in a portion of the outer sleeve which defines the corresponding fluid passage, and is closed by a sealing member fixed to the outer sleeve. The elastic mount further includes a pair of restricting protrusions which are respectively formed in the fluid chambers to protrude from the inner sleeve toward the outer sleeve in radially opposite directions, such that each protrusion has a radial end face which cooperates with the outer sleeve to define a restricted portion which has a predetermined radial dimension.

12 Claims, 7 Drawing Sheets

CYLINDRICAL ELASTIC MOUNT CONTAINING HIGHLY VISCOUS FLUID AND HAVING FLUID INJECTING INLET

BACKGROUND OF THE INVENTION

1. Field of the Invention

The present invention relates to a fluid-filled cylindrical elastic mount which provides a vibration damping effect based on flows of a highly viscous fluid contained therein. This elastic mount may be favorably used as a suspension bushing for an automobile, for example.

2. Discussion of Related Art

As one type of a vibration damper interposed between two members of a vibration system, there is known a fluid-filled cylindrical elastic mount which includes inner and outer metallic sleeves that are connected by a cylindrical elastic body, as disclosed in U.S. Pat. No. 4,883,260 to Kanda, which corresponds to Publication No. 5-47733 of examined Japanese Patent Application. The disclosed elastic mount has a pair of fluid chambers which are formed by closing pockets formed in the elastic body, and which are filled with a fluid having a relatively high viscosity. The elastic mount further includes restricting protrusions formed in the fluid chambers so as to protrude from the inner sleeve toward the outer sleeve, such that restricted portions are formed between the protrusions and the outer sleeve. When a vibrational load is applied between the inner and outer sleeves of the above cylindrical elastic mount, the highly viscous fluid is forced to flow in the restricted portions, so that the mount exhibits a high vibration damping effect based on the viscosity resistance or shearing stress of the viscous fluid.

If the above-described fluid-filled elastic mount is assembled within the highly viscous fluid so as to fill the fluid chambers with the fluid, in the same manner as used for filling a known elastic mount with a low viscosity fluid, a portion of the highly viscous fluid remains on or adheres to the surface of the elastic mount, requiring a cumbersome procedure for removing the fluid afterwards. Accordingly, the filling of the highly viscous fluid is generally effected by injecting the fluid into the fluid chambers through filler inlets, and then sealing or closing the inlets with suitable sealing or closure members, such as blind rivets, as disclosed in the above-identified publication.

In the above case, however, the sealing member closing the inlet protrudes into the corresponding fluid chamber, and the restricting protrusion in the fluid chamber may undesirably abut on the inlet when the elastic mount receives a torsional or twisting load which is applied to the inner and outer sleeves in the circumferential direction. As a result, the sealing member may be damaged due to the abutting contact with the protrusion, resulting in reduced fluid tightness of the mount, or the protrusion may be damaged with a result of deterioration of the vibration damping capability of the mount.

To avoid the above-described problems, the restricting protrusion must be made small-sized so as not to contact with the sealing member. This makes it difficult to ensure a sufficiently large area or volume of the restricted portion formed between the top face or extreme end face of the protrusion and the inner surface of the outer sleeve, and to provide a sufficiently high vibration damping effect based on the fluid flows in the restricted portion. Further, upon application of vibrations to the mount, the contact pressure which acts on unit area of the protrusion upon abutting contact with the outer sleeve is increased with a decrease of the surface area of the top face of the protrusion which defines the restricted portion. This results in reduced durability of the elastic mount.

In the known fluid-filled elastic mount as described above, an intermediate metallic sleeve is generally secured by vulcanization to the outer circumferential surface of the elastic body, and the intermediate sleeve is subjected to a drawing operation so that its diameter is reduced so as to apply preliminary compression to the elastic body to achieve sufficiently high durability of the elastic body. To assure the fluid tightness of the fluid chambers, a sealing rubber layer is interposed between the intermediate sleeve and the outer sleeve.

However, the formation of the sealing rubber layer on the outer circumferential surface of the intermediate sleeve makes it difficult to suitably draw the intermediate sleeve. Therefore, such a sealing rubber layer has to be formed on the inner circumferential surface of the outer sleeve. This necessitates two separate vulcanizing steps to form the elastic body and the sealing rubber layer, respectively, which result in reduced production efficiency of the elastic mount.

In the process of producing the above fluid-filled elastic mount, the pockets formed in the elastic body are open on the outer circumferential surface of the intermediate sleeve, through windows which are formed through the intermediate sleeve such that the windows are aligned with the pockets. It has been found considerably difficult to form these windows in the intermediate sleeve which takes the form of a pipe.

SUMMARY OF THE INVENTION

It is therefore a first object of the present invention to provide a fluid-filled cylindrical elastic mount containing a highly viscous fluid, which has high durability and which is able to provide a high vibration damping effect, based on flows of the fluid in a sufficiently large restricted portion formed between an outer sleeve and restricting protrusions that protrude from an inner sleeve, without suffering from abutting contact between the protrusions and a sealing member which closes an inlet through which the viscous fluid is injected into the mount.

It is a second object of the present invention to provide such a fluid-filled elastic mount as described above, which is constructed so as to permit a sealing rubber layer to be formed on an outer circumferential surface of the intermediate sleeve for sealing between the intermediate sleeve and the outer sleeve, without interfering with a process of preliminary compression of an elastic body formed between the intermediate sleeve and the inner sleeve, while requiring a single vulcanization step to form the sealing rubber layer and the elastic body simultaneously.

The above first object of the present invention may be accomplished according to the principle of the present invention, which provides a fluid-filled cylindrical elastic mount containing a highly viscous fluid, which comprises a) an inner sleeve and an outer sleeve which are radially spaced apart from each other, b) an elastic body interposed between the inner and outer sleeves, for elastically connecting the inner and outer sleeves, the elastic body having a pair of pockets formed on opposite sides of the inner sleeve and opposed to each other in one diametral direction of the mount in which a vibrational load is applied, the pockets being closed by the outer sleeve so as to provide a pair of fluid chambers which contain the highly viscous fluid, the elastic body further having at least one groove each of which is formed between corresponding circumferential ends of the pair of pockets, said each groove being closed by said outer sleeve so as to provide a fluid passage which communicates with the part of fluid chambers, c) the outer sleeve having at least one inlet through which the highly viscous fluid is injected into the mount, each of the at least one inlet being formed in a portion of the outer sleeve which cooperates with the each groove to define the fluid passage, d) a pair of restricting protrusions which are respectively formed in the pair of fluid chambers, so as to protrude from the inner sleeve toward the outer sleeve in radially opposite directions parallel to said one diametral direction, each of the restricting protrusions cooperating with the outer sleeve to define a restricted portion which has a predetermined radial dimension, and e) at least one sealing member fixed to the outer sleeve for closing the inlet or inlets.

In the fluid-filled cylindrical elastic mount constructed as described above according to the present invention, the inlet or inlets is/are formed through the outer sleeve so as to communicate with the fluid passage or passages, and the sealing member for closing the inlet does not protrude into any of the fluid chambers, and is prevented from abutting on the restricting protrusion provided in each fluid chamber. Therefore, the restricting protrusion is given a sufficiently large surface area on its radial end face which cooperates with the outer sleeve to define a restricted portion, which results in an improved vibration damping effect of the mount. Further, the present elastic mount which is free from abutting contact between the restricting protrusions and the sealing member(s) has a high degree of durability.

The fluid-filled cylindrical elastic mount constructed as described above may further include an intermediate sleeve secured to an outer surface of the elastic body, and a sealing rubber layer formed on an outer circumferential surface of the intermediate sleeve. The intermediate sleeve has a pair of windows that are aligned with the pockets of the elastic body, respectively, the outer sleeve being fitted on the intermediate sleeve through the sealing rubber layer.

To attain the above-described second object of the invention, the intermediate sleeve may have a first cut formed in a circumferential portion thereof between one of opposite circumferential ends of one of the pair of windows and a corresponding circumferential end of the other window, the first cut extending over substantially an entire length of the intermediate sleeve. In this case, the elastic body has a second cut which extends from the outer surface thereof and which is aligned with the first cut of the intermediate sleeve.

The elastic mount wherein the intermediate sleeve and the elastic body have the first and second cuts, respectively, can be fabricated by first preparing an integral intermediate assembly consisting of the inner sleeve, the intermediate sleeve and the elastic body interposed between the inner and intermediate sleeves. In this intermediate assembly, the intermediate sleeve has a slit while the elastic body has a void aligned with the slit. After the outer sleeve is fitted on the intermediate assembly, the outer sleeve is subjected to a drawing operation by which the diameter of the outer sleeve is reduced, whereby the intermediate sleeve and the elastic body are radially inwardly compressed. As a result, the slit in the intermediate sleeve and the void in the elastic body are substantially eliminated, so that the slit and the void give the mutually aligned first and second cuts. Thus, the elastic body is subjected to preliminary compression.

Thus, the intermediate sleeve is not directly subjected to radial compression to radially compress the elastic body.

Further, the slit and void permit easy radial compression of the intermediate sleeve and the elastic body when the outer sleeve is subjected to radial compression. This means that the sealing rubber layer may be formed on the intermediate sleeve, rather than on the outer sleeve, integrally with the elastic body, by simultaneous vulcanization of the elastic body and the sealing rubber layer. Accordingly, the manufacture of the present mount is facilitated.

Moreover, the intermediate sleeve need not be formed from a metallic pipe. That is, the intermediate sleeve may be formed from a metallic sheet, which can be easily processed to form the windows and then formed into a substantially cylindrical shape having the slit. The use of such a metallic sheet leads to reduction in the cost of manufacture of the present elastic mount.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF PREFERRED EMBODIMENTS

Figure 1:
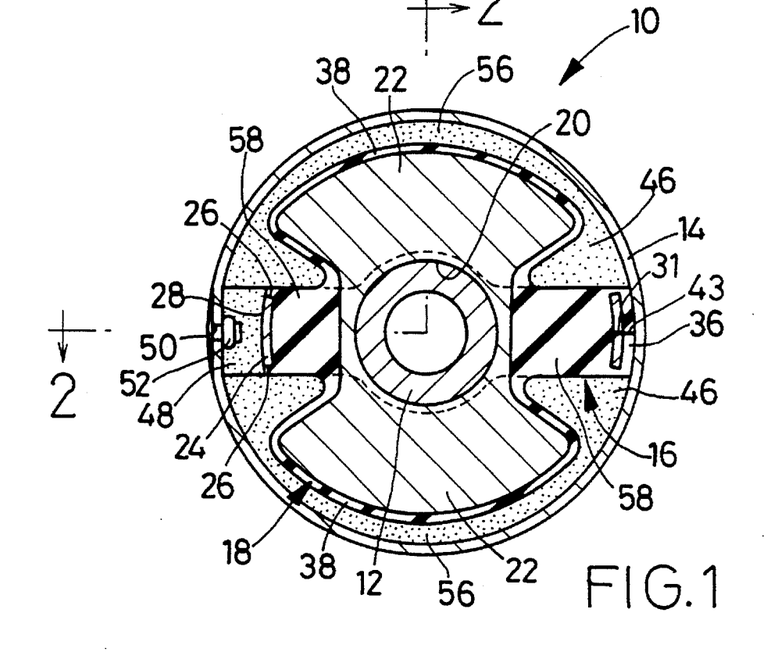
FIG. 1 is an elevational view in transverse cross section of one embodiment of a fluid-filled cylindrical elastic mount of the present invention.
Figure 2:
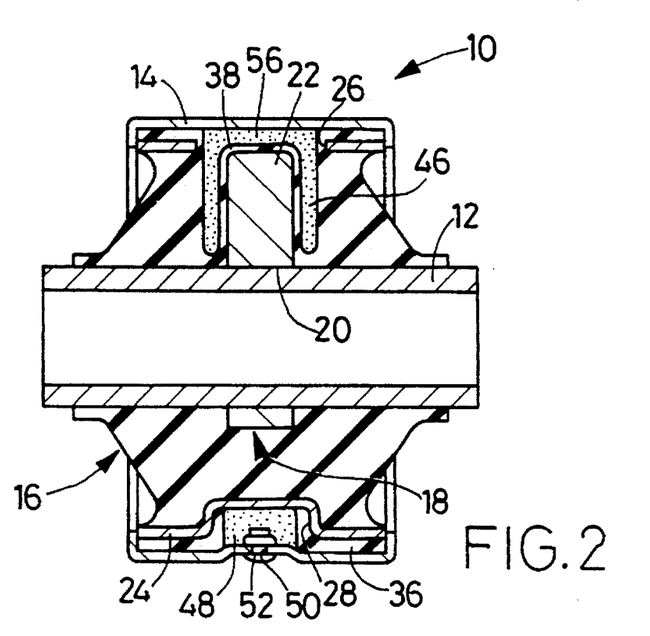
FIG. 2 is a cross sectional view taken along lines 2—2 of FIG. 1.

Referring first to FIGS. 1 and 2 showing one preferred embodiment of the present invention, a cylindrical elastic mount 10 includes an inner sleeve 12 and an outer sleeve 14 both made of metal, and an elastic body 16 made of a rubber material. These inner and outer sleeves 12, 14 are radially spaced apart from each other, and are connected with each other by the elastic body 16 interposed therebetween. This cylindrical elastic mount 10 is interposed between two members which are to be flexibly connected to each other in a vibration damping manner, such that the inner and outer sleeves 12, 14 are respectively attached to one and the other of the two members. With the elastic mount 10 installed in position, a vibrational load is applied to the mount 10 primarily in a diametral direction thereof which corresponds to the vertical direction as viewed in FIG. 1.

Figure 3:
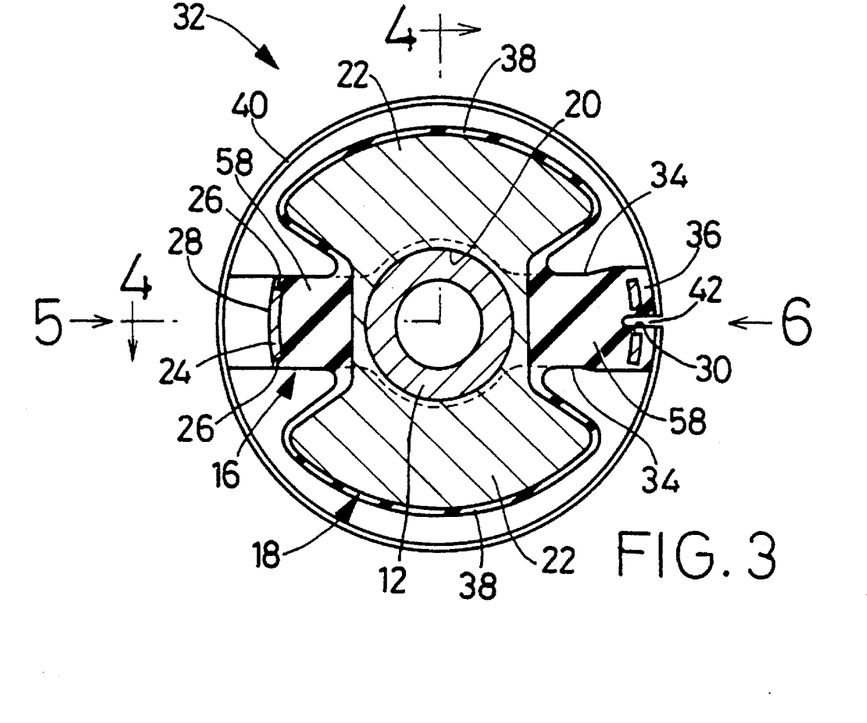
FIG. 3 is a transverse cross sectional view showing an intermediate assembly which is obtained by vulcanization in the process of producing the elastic mount of FIG. 1.

More specifically described referring to FIG. 3 through FIG. 6, the inner sleeve 12 is a cylindrical metallic member having a relatively large wall thickness. The elastic mount 10 further includes a wing member 18 which is attached to an axially middle portion of the inner sleeve 12. The wing member 18 is a generally plate-like member having a relatively large thickness, and has a mounting hole 20 at its center portion. This wing member 18 includes as integral parts thereof a pair of sectoral protrusions 22, 22 which extend radially outwards from the central portion of the wing member 18 having the hole 20, as shown in FIG. 3. With the inner sleeve 10 press-fitted in the mounting hole 20, the wing member 18 is fixed to the axially middle portion of the inner sleeve 10.

Radially outwardly of the inner sleeve 12, there is disposed an intermediate sleeve 24 which is a generally cylindrical metallic member having a relatively small wall thickness. This intermediate sleeve 24 has a pair of windows 26, 26 formed in diametrally opposite, axially middle portions thereof, such that each window 26 extends along an arc slightly shorter than a half of the circumference of the mount. The intermediate sleeve 24 is formed with an arcuate groove 28 which extends between one circumferential end of one of the two windows 26 and the corresponding circumferential end of the other window 26. These two circumferential ends of the two windows 26 are opposed to each other in the circumferential direction of the mount 10. The arcuate groove 28 is open radially outwards of the intermediate sleeve 24.

Before the mount 10 is assembled, the intermediate sleeve 24 has an axial slit 30 (FIG. 3) which is formed in a circumferential portion thereof between the other circumferential ends of the two windows 26, such that the slit 30 is located diametrally opposite to the arcuate groove 28. The axial slit 30 extends over the entire axial length of the intermediate sleeve 24, so as to split or part the sleeve 24 in the circumferential direction. In other words, the intermediate sleeve 24 has circumferentially opposite end faces which are opposed to each other with a suitable spacing therebetween, which defines the slit 30. This intermediate sleeve 24 may be formed by first punching a metallic plate to form the windows 26, 26 and then bending the plate into a substantially cylindrical shape, so that the opposite ends of the plate define the axial slit 30.

The thus formed intermediate sleeve 24 is disposed radially outwardly of the inner sleeve 12 in substantially coaxial relationship with the sleeve 12, and is positioned relative to the inner sleeve 12 in the circumferential direction, such that the protrusions 22, 22 of the operating member 18 protrude toward the respective windows 26, 26 of the intermediate sleeve 24.

The elastic body 16 is interposed between the inner sleeve 12 and the intermediate sleeve 24. This elastic body 16 is a generally cylindrical rubber member having a relatively large wall thickness. The inner sleeve 12 and the intermediate sleeve 24 are secured by vulcanization to the inner and outer circumferential surfaces of the elastic body 16, respectively, so as to provide an integral intermediate assembly 32, as shown in FIG. 3.

The elastic body 16 has a pair of pockets 34, 34 which are formed in diametrally opposite, axially middle portions thereof which are aligned with the windows 26, 26 of the intermediate sleeve 24. These pockets 34, 34 are open on the outer circumferential surface of the intermediate sleeve 24 through the corresponding windows 26, 26. The above-indicated protrusions 22, 22 of the wing member 18 protrude from axially middle portions of bottom walls of the respective pockets 34, 34, as shown in FIG. 4.

A relatively thin, sealing rubber layer 36 is formed over substantially the entire area of the outer circumferential surface of the intermediate sleeve 24. The sealing rubber layer 36 has sealing lips 40 which are formed integrally on the outer surfaces of axial end portions of the layer 36, as shown in FIG. 4, so as to extend continuously in the circumferential direction, as shown in FIG. 3. Each of the protrusions 22, 22 of the wing member 18 is also covered with a rubber layer, a part of which provides a buffer rubber layer 38 formed on a radial end face or top face of the protrusion 22. In this embodiment, the sealing rubber layer 36 and the buffer rubber layers 38 are formed integrally with the elastic body 16.

Figure 6:
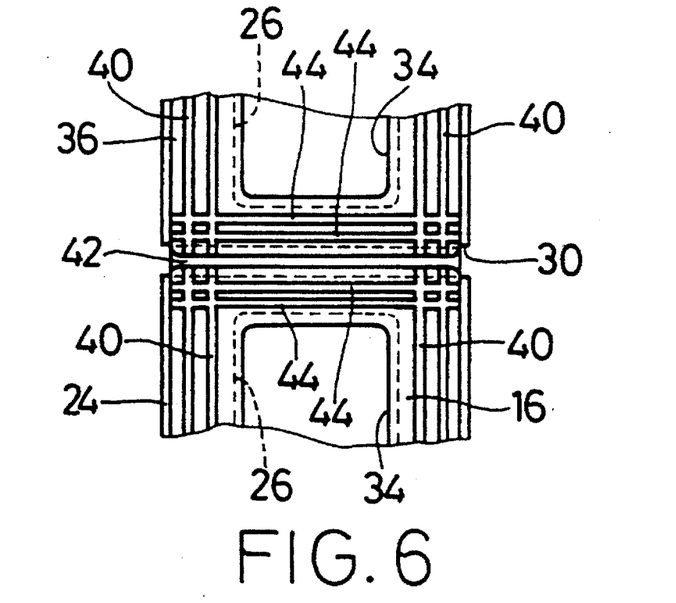
FIG. 6 is a view showing the intermediate assembly as viewed in a direction of an arrow 6.

The elastic body 16 has an axial void 42 which is formed in the outer circumferential surface thereof over the entire axial length of the slit 30 of the intermediate sleeve 24 such that the void 42 extends radially inwardly into the slit 30. As shown in FIG. 6, sealing lips 44 are formed integrally on the sealing rubber layer 36 at its mutually facing portions that define the axial void 42, such that the sealing lips 42 axially extend along the length of the void 42.

Figure 4:
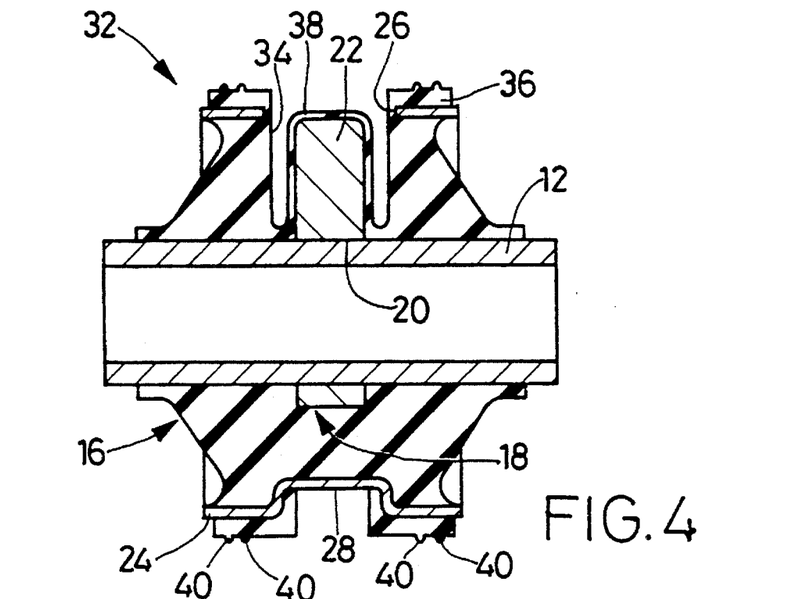
FIG. 4 is a cross sectional view taken along lines 4—4 of FIG. 3.
Figure 5:
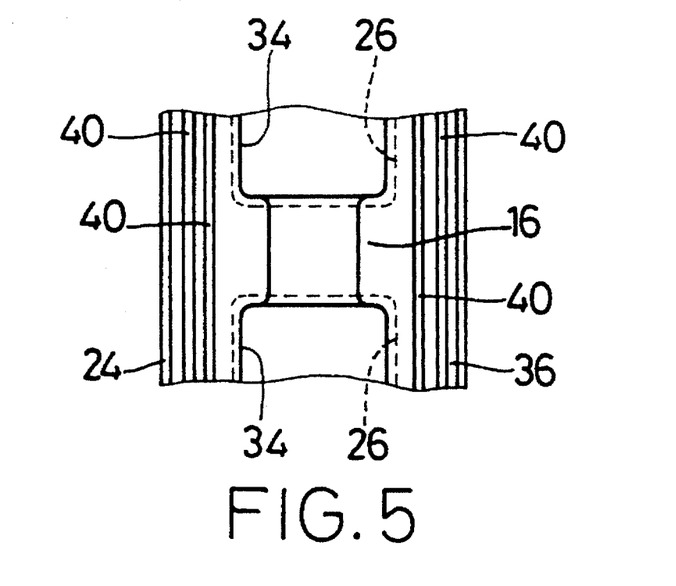
FIG. 5 is a view showing the intermediate assembly of FIG. 3 as viewed in a direction of an arrow 5.

In producing the integral intermediate assembly 32 as described above, it is preferable to use a metal mold which has a parting line that extends in the vertical direction as viewed in FIG. 4 and is also dividable in the lateral direction. The use of such a metal mold advantageously avoids formation of undercuts, for example, in the intermediate assembly.

The integral intermediate assembly 32 thus produced is inserted into the outer sleeve 14, and the diameter of the outer sleeve 14 is then reduced using eight drawing dies, for example. At the same time, the outer sleeve 14 is caulked at its axially end portions against the intermediate sleeve 24 of the assembly 32. In this manner, the outer sleeve 14 is fixedly fitted on the outer circumferential surface of the intermediate sleeve 24 while engaging the axially opposite ends of the intermediate sleeve 24, as shown in FIGS. 1 and 2.

When the diameter of the outer sleeve 14 is reduced as described above, the compressive force applied to the outer sleeve 14 for reducing its diameter is transmitted to the intermediate sleeve 24, whereby the slit 30 of the sleeve 24 is narrowed or substantially eliminated with a result of reduction in the diameter of the intermediate sleeve 24. Thus, the slit 30 provides a cut 31 (FIG.1) in the sleeve 24. Consequently, the axial void 42 of the elastic body 16 is also substantially eliminated. Thus, the elastic body 16 is subjected to preliminary compression, and has a cut 43 (FIG. 1) which corresponds to the void 42 and which is aligned with the cut 31 in the sleeve 24.

With the diameter of the outer sleeve 14 thus reduced, the sealing rubber layer 36 is gripped under pressure between the outer sleeve 14 and the intermediate sleeve 24, so that the outer sleeve 14 is fluid-tightly fitted on and thus fixed to the outer circumferential surface of the intermediate sleeve 24.

In this arrangement, the pockets 34, 34 of the elastic body 16 and the arcuate groove 28 of the intermediate sleeve 24 are fluid-tightly closed by the outer sleeve 14, so that a pair of fluid chambers 46, 46 and a fluid passage 48 are formed by the pockets 34, 34 and the groove 28, respectively. Thus, the fluid chambers 46, 46 are located on the opposite sides of the inner sleeve 12 such that the chambers 46, 46 are opposed to each other in the vibration-receiving direction (the vertical direction in FIG. 1), and are held in fluid communication with each other through the fluid passage 48.

Further, the outer sleeve 14 has an inlet 50 formed in its portion that cooperates with the groove 28 to define the fluid passage 48. A suitable fluid having a relatively high viscosity is injected through the inlet 50 so as to fill the fluid chambers 46, 46 and the fluid passage 48. To assure a high vibration damping effect of the elastic mount 10, the highly viscous fluid generally has a coefficient of viscosity of 1–100 Pa.s, though the specific viscosity is determined depending upon desired vibration damping and isolating characteristics. For example, silicone oil is used as the viscous fluid.

After the injection of the highly viscous fluid, a blind rivet 52 is inserted into the inlet 50 and fixed to the outer sleeve 14 by caulking, so as to close and seal the inlet 50. This blind rivet 52 protrudes from the outer sleeve 14 into the fluid passage 48. The portion of the outer sleeve 14 which has the inlet 50 is slightly dented radially inwards to form a recess adapted to receive a head portion of the blind rivet 52, as shown in FIG. 2.

In the thus constructed cylindrical elastic mount 10, a restricted portion 56 having a substantially constant radial dimension is formed between the top face of each of the protrusions 22 and the opposed face of the outer sleeve 14. When vibrations are applied between the inner and outer sleeves 12, 14 in the diametral direction in which the fluid chambers 46, 46 are opposed to each other, the viscous fluid is caused to flow in the restricted portions 56 as the radial dimension of the portions 56 is varied, so as to effectively damp the vibrations based on the shearing stress or viscosity resistance of the viscous fluid. The elastic mount 10 of the instant embodiment also provides a high damping effect with respect to vibrations applied in the axial direction of the mount 10, based on the shearing stress or viscosity resistance of the highly viscous fluid, since the viscous fluid is caused to flow around the protrusions 22 in the fluid chambers 46 upon application of such axial vibrations.

In the cylindrical elastic mount 10 as described above, the inlet 50 is formed in the portion of the outer sleeve 14 which defines the fluid passage 48, and the blind rivet 52 protrudes into the fluid passage 48, but not into any of the fluid chambers 46. Accordingly, the protrusions 22 can be large-sized, and the surface area of the top face of each protrusion 22 facing the outer sleeve 14 can be significantly increased, without causing any contact of the protrusion 22 with the blind rivet 52. Consequently, the restricted portions 56 is provided with a sufficiently large volume, that is, large circumferential and axial dimensions, which lead to increased shearing stress occurring in the portions 56, based on which the instant elastic mount 10 provides an improved vibration damping effect.

In the cylindrical elastic mount 10, there is no possibility of abutting contact of the protrusions 22 with the blind rivet 52 upon application of a torsional vibration load in the circumferential direction. Therefore, the protrusions 22 are free from any damage due to such contact, and exhibit high durability. Further, since the top face of each of the protrusions 22 facing the outer sleeve 14 has a sufficiently large surface area, as described above, the pressure of abutting contact between the protrusion 22 and the outer sleeve 14 is advantageously distributed over the large area and accordingly reduced when the elastic mount 10 receives a great load in the above-indicated diametral direction, resulting in further improved durability of the mount 10.

In the cylindrical elastic mount 10 of the present embodiment, each of the protrusions 22 has circumferentially opposite end faces which are opposed in the circumferential direction to respective partition walls 58, 58 formed on the elastic body 16 for defining the fluid chambers 46, 46, with a suitable spacing therebetween. When a great torsional load is applied between the inner and outer sleeves 12, 14 in the circumferential direction, therefore, relative circumferential displacement of the sleeves 12, 14 is favorably limited due to abutting contact of the protrusions 22 with the partition walls 58. In this connection, the radial dimensions of the intermediate sleeve 24 and the protrusions 22 are determined such that the circumferentially opposite ends of the bottom wall of the arcuate groove 28 formed in the sleeve 24 are opposed to the corresponding circumferential end faces of the protrusions 22. Therefore, the intermediate sleeve 24 may abut on the protrusions 22 upon application of a great torsional load in the circumferential direction, whereby excessive deformation of the elastic body 16 due to the applied load can be prevented.

In the above cylindrical elastic mount 10 having the axial slit 30 formed in the intermediate sleeve 24, the diameter of the sleeve 24 can be easily reduced to give the elastic body 16 preliminary compression, simply by reducing the diameter of the outer sleeve 14 after it is fitted on the intermediate sleeve 24. Since the intermediate sleeve 24 need not be directly subjected to radial compression, the present elastic mount 10 can be produced in a simplified manner with improved efficiency.

Further, the sealing rubber layer 36 can be formed on the outer circumferential surface of the intermediate sleeve 24 since any force need not be directly applied to the sleeve 24 to reduce its diameter, namely, the sleeve 24 is not subjected to radial compression. Accordingly, the sealing rubber layer 36 can be formed integrally with the elastic body 16 by simultaneously vulcanizing the rubber layer and body 36, 16, whereby the process of producing the elastic mount 10 can be further simplified.

Moreover, the intermediate sleeve 24 of the instant elastic mount has the cut 31 corresponding to the slit 30. This intermediate sleeve 24 may be formed from a metallic sheet in which the windows 26, for example, can be formed with improved efficiency. This also reduces the cost of manufacturing the elastic mount 10.

In the present embodiment, the groove 28 for forming the fluid passage 48 is formed in only one of the diametrally opposite portions of the intermediate sleeve 24 which are located between the pockets 34, 34, while the cut 31 is formed in the other portion in which the groove 28 is not formed. Therefore, the formation of the cut 31 does not affect the fluid tightness of the elastic mount 10.

Figure 7:
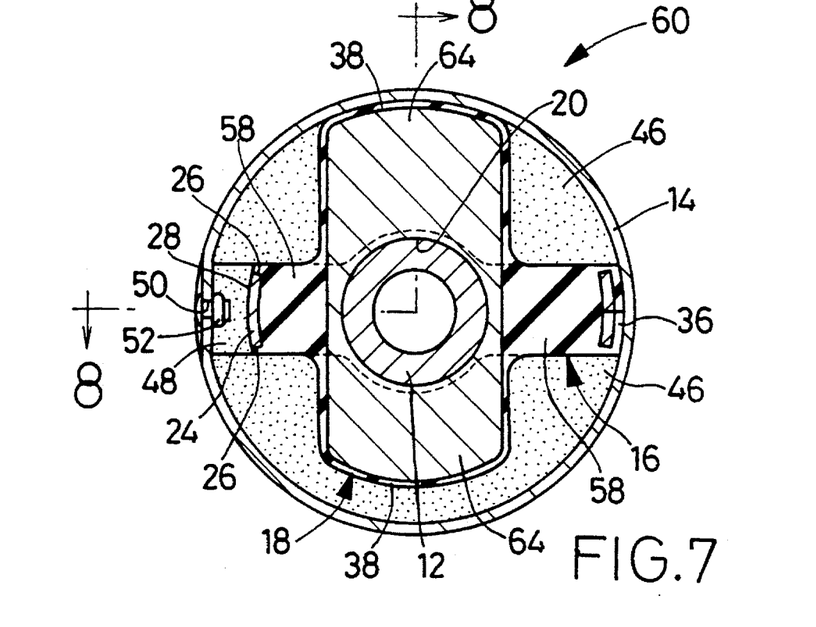
FIG. 7 is an elevational view in transverse cross section of another embodiment of the fluid-filled cylindrical elastic mount of the present invention.
Figure 8:
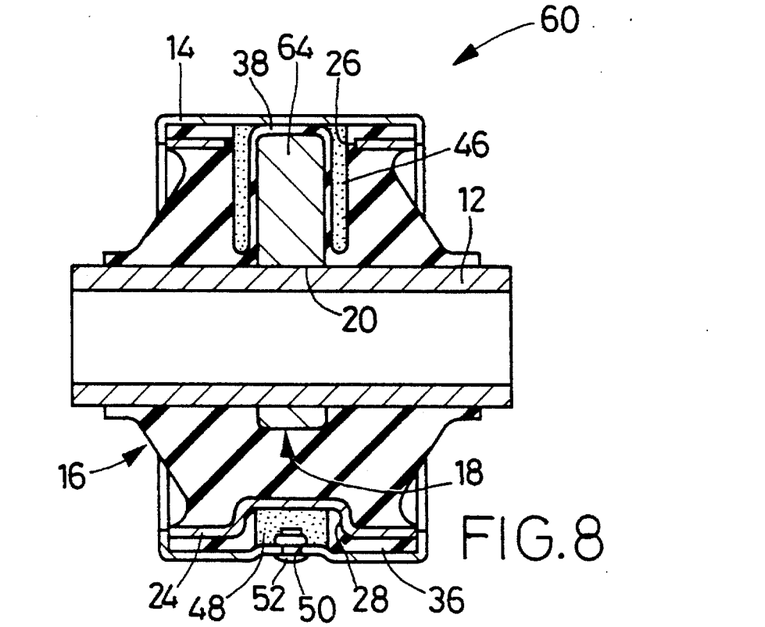
FIG. 8 is a cross sectional view taken along lines 8—8 of FIG. 7.
Figure 9:
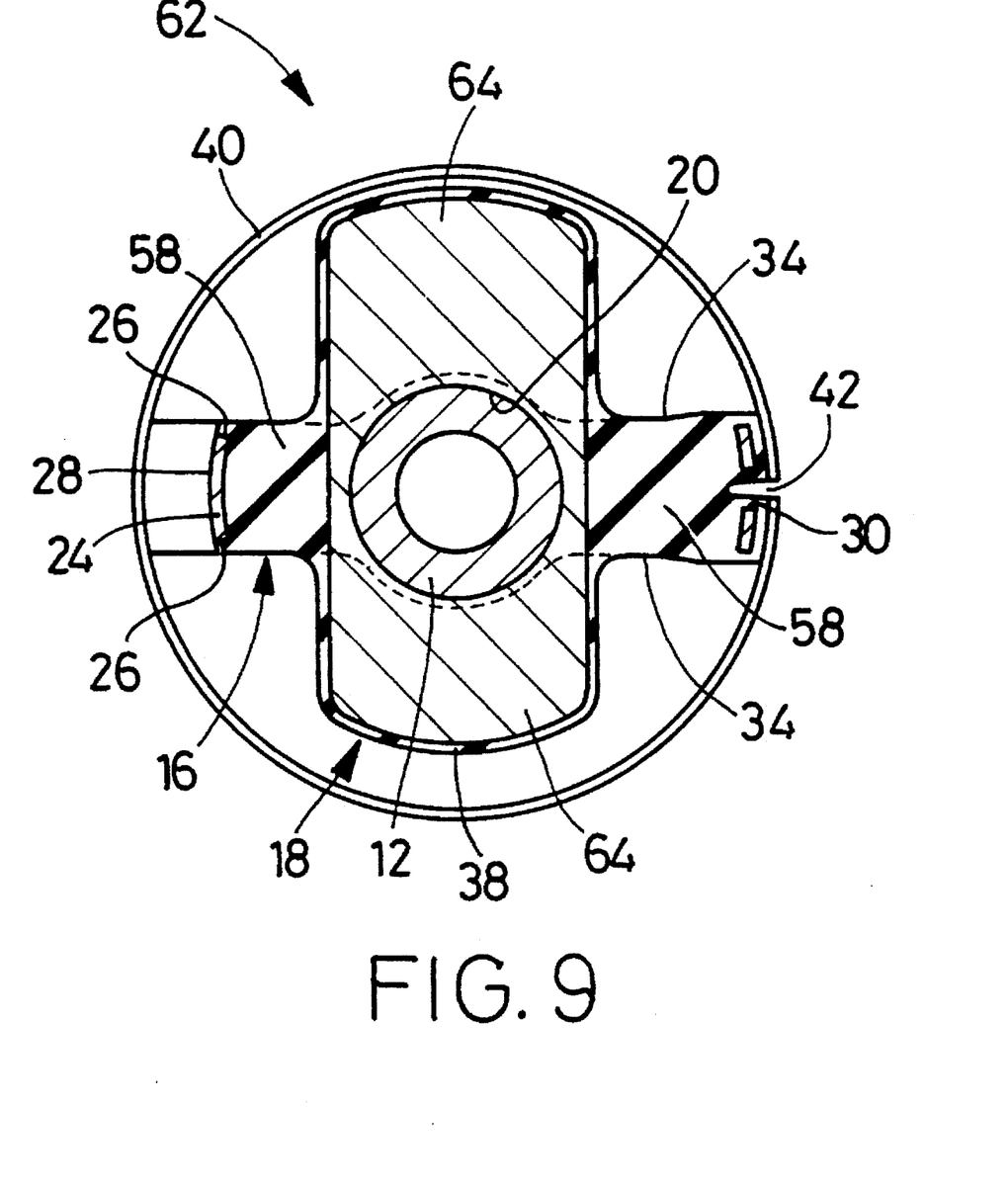
FIG. 9 is a transverse cross sectional view showing an intermediate assembly which is obtained by vulcanization in the process of producing the elastic mount of FIG. 7.

FIGS. 7 and 8 show a cylindrical elastic mount 60 as another embodiment of the present invention, and FIG. 9 shows an integral intermediate assembly 62 which is formed in the process of producing the elastic mount 60. In the following description of the second embodiment, the same reference numerals as used in the first embodiment will be used to identify structurally and/or functionally corresponding elements, for which no detailed description will be provided.

The cylindrical elastic mount 60 employs a generally rectangular, plate-like wing member 18, which provides protrusions 64, 64 that protrude from the inner sleeve 12 toward the outer sleeve 14, into the respective fluid chambers 46. The protrusions 64, 64 extend in the opposite radial directions in which the elastic mount 60 receives a vibrational load, and have a substantially constant width as viewed in the direction perpendicular to the axial and radial directions of the mount 10.

The radial end faces or top faces of the protrusions 64, 64 are curved so as to conform to the inner circumferential surface of the outer sleeve 14, and the top face of one (the upper one in FIG. 7) of the protrusions 64 is held in abutting contact with the outer sleeve 14. When the elastic mount 60 is installed in position, a static load including the weight of one of the two members to be flexibly supported is applied between the inner and outer sleeves 12, 14, and the inner sleeve 12 is displaced downwards (in FIG. 7) relative to the outer sleeve 14, so that a restricted portion or clearance having substantially the same radial dimension is formed between the top face of each of the two protrusions 64, 64 and the outer sleeve 14.

The thus constructed cylindrical mount 60 provides similar effects as provided in the first embodiment. More specifically, the blind rivet 52 for sealing the inlet 50 is completely prevented from abutting on the protrusions 64 since the inlet 50 is formed through a wall defining the fluid passage 48. Further, the slit 30 is formed in the intermediate sleeve 24 so that the elastic body 16 inside the sleeve 24 is preliminarily compressed by reducing the diameter of the outer sleeve 14 fitted on the intermediate sleeve 24.

Figure 10:
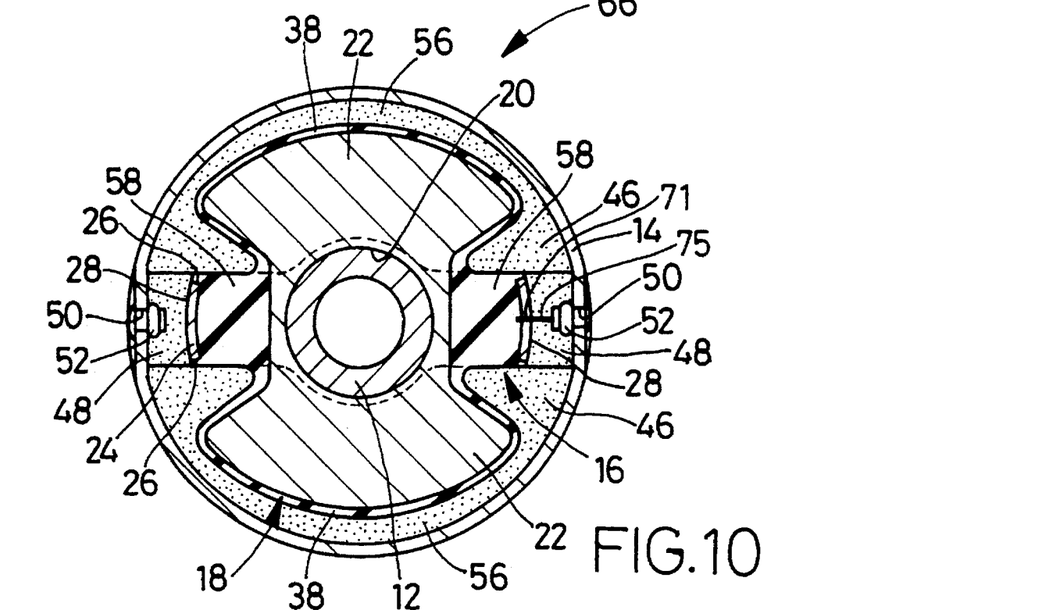
FIG. 10 is an elevational view in transverse cross section of a further embodiment of the fluid-filled cylindrical elastic mount of the present invention.
Figure 11:
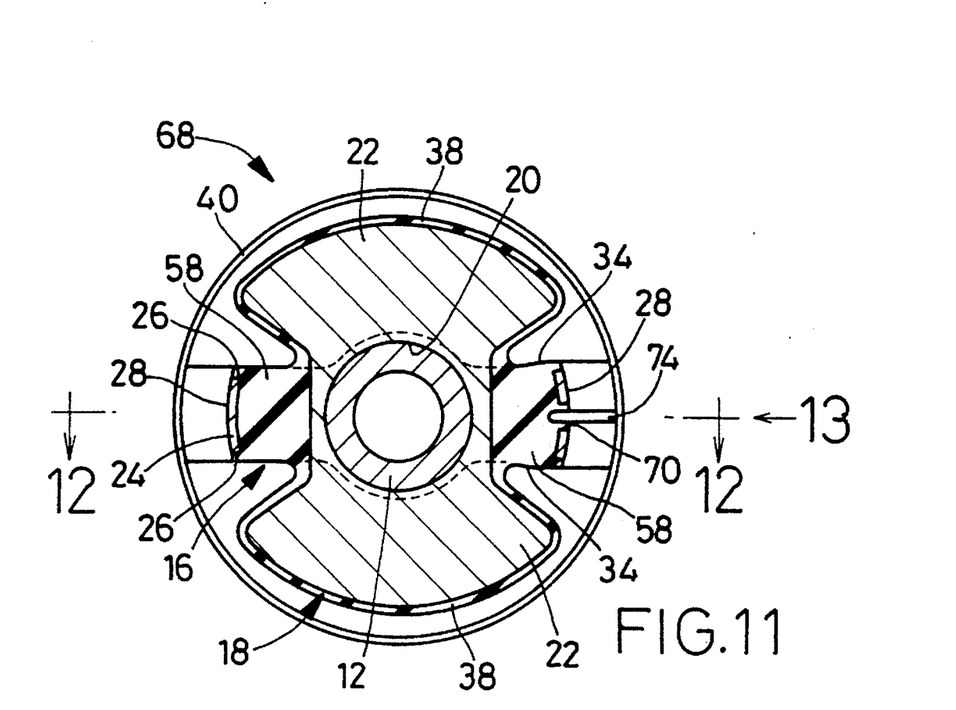
FIG. 11 is a transverse cross sectional view showing an intermediate assembly which is obtained by vulcanization in the process of producing the elastic mount of FIG. 10.
Figure 12:
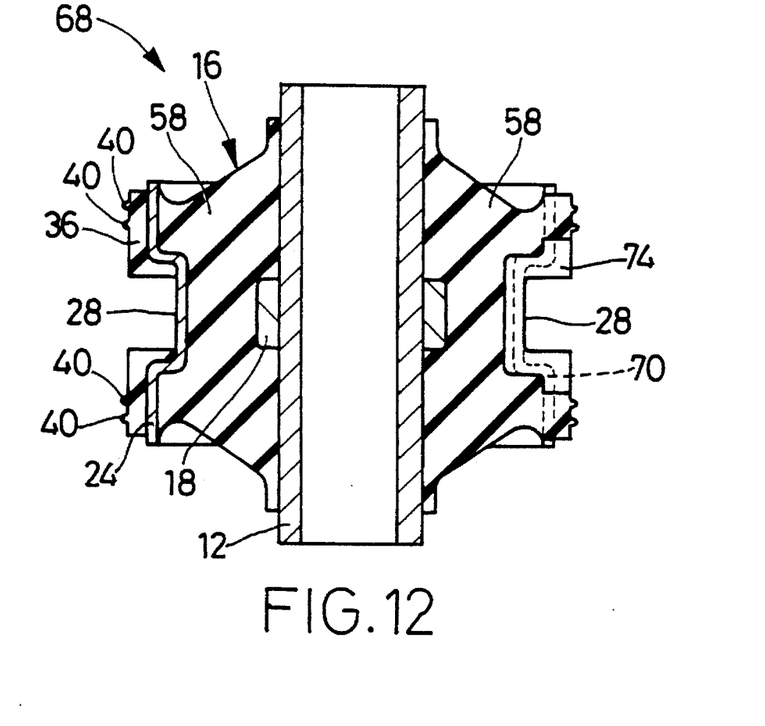
FIG. 12 is a cross sectional view taken along lined 12—12 of FIG. 11.
Figure 13:
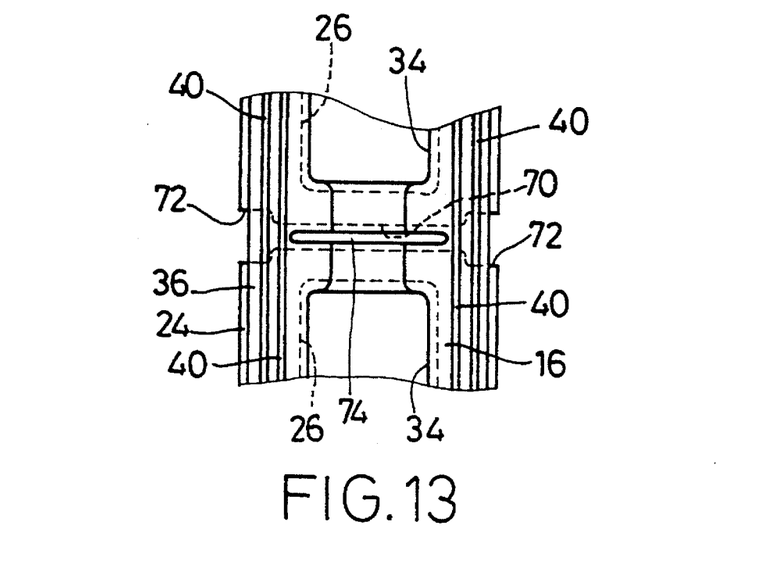
FIG. 13 is a view showing the intermediate assembly of FIG. 11 as viewed in a direction of an arrow 13.

FIG. 10 shows a cylindrical elastic mount 66 as a further embodiment of the present invention, and FIGS. 11–13 show an integral intermediate assembly 68 which is formed in the process of producing the elastic mount 66. In the following description of the third embodiment, the same reference numerals as used in the first embodiment will be used to identify structurally and/or functionally corresponding elements, for which no detailed description will be provided.

In the cylindrical elastic mount 66, a pair of fluid passages 48 are formed in diametrally opposite portions of the mount 66, which are located between the corresponding circumferential ends of the fluid chambers 46, 46. This elastic mount 66 also has two inlets 50 which permit injection of a highly viscous fluid and are closed and sealed by respective blind rivets 52. These inlets 50 are formed in the outer sleeve 14 so as to communicate with the respective fluid passage 48.

As shown in FIGS. 11–13, an axial slit 70 is formed in the intermediate sleeve 24 at one of the two arcuate grooves 28 which form the two fluid passages 48, such that the slit 70 is located at a circumferentially middle portion of the above-indicated one groove 28. The intermediate sleeve 24 is split or parted by the slit 70 which extends over the entire axial length of the sleeve 24. This axial slit 70 includes axially opposite end portions 72, 72 which have a larger width than the other portion, as shown in FIG. 13.

The elastic body 16 has a void 74 which is formed in an axially middle portion of the slit 70 of the intermediate sleeve 24 so as to extend from the outer circumferential surface of the elastic body 16 into the slit 70. That is, the void 74 does not extend into the axially opposite portions of the elastic body 16 on which the sealing lips 40 are formed, whereby the lips 40 extend continuously over the entire circumference of the mount.

Then, the outer sleeve 14 is fitted on the integral intermediate assembly 68 of the inner sleeve 12, elastic body 16 and intermediate sleeve 24 constructed as described above. As in the first embodiment, the diameter of the outer sleeve 14 is reduced so as to narrow the slit 70 into a cut 71 (FIG. 10) and reduce the diameter of the intermediate sleeve 24. Consequently, the elastic body is preliminarily compressed with the void 74 substantially eliminated so as to form a cut 75 (FIG. 10) which is aligned with the cut 71.

Since the void 74 is not formed in the axially opposite end portions of the elastic body 16, the outer sleeve 14 closely contacts the outer surface of the elastic body 16, assuring a high degree of fluid tightness of the elastic mount 66. With the slit 70 having the relatively wide end portions 72, the elastic body 16 which is preliminarily compressed applies its elastic force on the sealing lips 40 formed thereon, through the wide end portions 72, whereby the fluid tightness is further enhanced.

The thus constructed cylindrical elastic mount 66 provides similar effects as provided in the first embodiment. More specifically, the blind rivets 52 for sealing the two inlets 50 are completely prevented from abutting on the protrusions 64 since the inlets 50 are formed through respective walls (part of the outer sleeve 14) defining the fluid passages 48. Further, the slit 70 is formed in the intermediate sleeve 24 so that the elastic body 16 inside the sleeve 24 is preliminarily compressed by reducing the diameter of the outer sleeve 14 fitted on the intermediate sleeve 24. This leads to improved production efficiency of the present elastic mount 66.

In the cylindrical elastic mount 66 of this embodiment having the two inlets 50, 50, a viscous fluid may be injected through one of the inlets 50 while the air is sucked through the other inlet 50. Thus, injection of the fluid can be effected with increased ease and efficiency.

While the present invention has been described in its presently preferred embodiments, it is to be understood that the invention is not limited to the details of the illustrated embodiments, but may be otherwise embodied.

For example, the shape of the restricting protrusions of the wing member which protrude into the respective fluid chambers are not limited to those of the illustrated embodiments. That is, the shape of the protrusions is suitably determined depending upon vibrations and static loads applied to the mount, desired vibration damping characteristics, and desired function of the protrusions as stoppers. In the cylindrical elastic mount according to the present invention, this determination can be made with a high freedom of design, without taking account of a risk of abutting contact between the protrusions and a sealing member or members for sealing a fluid inlet or inlets.

The sealing member for closing and sealing the inlet for the viscous fluid is not limited to the blind rivet as employed in the illustrated embodiments, but may be selected from other types of sealing members.

It is to be understood that the present invention may be embodied with various other changes, modifications and improvements, which may occur to those skilled in the art, without departing from the scope of the invention defined in the following claims.

What is claimed is:

1. A fluid-filled cylindrical elastic mount containing a highly viscous fluid, comprising:

an inner sleeve and an outer sleeve which are radially spaced apart from each other;

an elastic body interposed between said inner and outer sleeves, for elastically connecting the inner and outer sleeves, said elastic body having a pair of pockets formed on opposite sides of said inner sleeve and opposed to each other in one diametral direction of the mount in which a vibrational load is applied, said pockets being closed by said outer sleeve so as to provide a pair of fluid chambers which contain said highly viscous fluid, said elastic body further having at least one groove formed between corresponding circumferential ends of said pair of pockets;

an intermediate sleeve interposed between said elastic body and said outer sleeve, and having a pair of windows aligned with said pair of pockets, respectively, said intermediate sleeve including at least one grooved portion formed between corresponding circumferential ends of said pair of windows, said at least one grooved portion being secured to a surface of said elastic body which defines said at least one groove, said at least one grooved portion being closed by said outer sleeve so as to provide a fluid passage which communicates with said pair of fluid chambers;

said outer sleeve having at least one inlet through which said highly viscous fluid is injected into the mount, said at least one inlet being formed in a portion of the outer sleeve which cooperates with said at least one grooved portion of said intermediate sleeve to define said fluid passage, so that said at least one inlet is directly open to said fluid passage;

a pair of restricting protrusions which are respectively formed in said pair of fluid chambers, so as to protrude from said inner sleeve toward said outer sleeve in radially opposite directions parallel to said one diametral direction, each of said restricting protrusions having a radial end face which cooperates with said outer sleeve to define a restricted portion which has a predetermined radial dimension; and at least one sealing member fixed to said outer sleeve for closing said at least one inlet.

2. A fluid-filled cylindrical elastic mount as defined in claim 1, further comprising a sealing rubber layer formed on an outer circumferential surface of said intermediate sleeve, said outer sleeve being fitted on said intermediate sleeve through said sealing rubber layer.

3. A fluid-filled cylindrical elastic mount as defined in claim 2, wherein said intermediate sleeve has a first cut formed in a circumferential portion thereof between one of opposite circumferential ends of one of said pair of windows and a corresponding circumferential end of the other of the windows, said first cut extending over substantially an entire length of the intermediate sleeve, said elastic body having a second cut which extends from the outer surface thereof and which is aligned with said first cut of said intermediate sleeve.

4. A fluid-filled cylindrical elastic mount as defined in claim 3, wherein said at least one groove consists of a pair of grooves which cooperate with said outer sleeve to define a pair of fluid passages which are formed between the corresponding circumferential ends of said pair of windows.

5. A fluid-filled cylindrical elastic mount as defined in claim 4, wherein said at least one inlet consists of two inlets which are respectively formed in diametrally opposite portions of said outer sleeve so as to communicate with said pair of fluid passages, respectively.

6. A fluid-filled cylindrical elastic mount as defined in claim 3, wherein said fluid passage is formed between the other of said opposite circumferential ends of said one of said pair of windows and a corresponding circumferential end of said other of the windows, said at least one inlet consisting of an inlet which communicates with said fluid passage and is located diametrally opposite to said first cut of said intermediate sleeve.

7. A fluid-filled cylindrical elastic mount as defined in claim 2, wherein said intermediate sleeve is formed from a metallic sheet, which is provided with said pair of windows and then formed into a substantially cylindrical shape.

8. A fluid-filled cylindrical elastic mount as defined in claim 1, wherein said pockets are formed in axially middle portions of said elastic body, and wherein each of said restricting protrusions is formed in an axially middle portion of a corresponding one of said pair of fluid chambers, such that said each restricting protrusion cooperates with inner walls of said elastic body to define axially opposite restricted portions therebetween.

9. A fluid-filled cylindrical elastic mount as defined in claim 1, further comprising a buffer rubber layer formed on at least said radial end face of each of said restricting protrusions.

10. A fluid-filled cylindrical elastic mount as defined in claim 1, wherein each of said restricting protrusions has circumferential opposite end faces which are respectively opposed to inner walls of said elastic body which define a corresponding one of said fluid chambers in a circumferential direction of the mount.

11. A fluid-filled cylindrical elastic mount as defined in claim 1, wherein said at least one sealing member comprises a blind rivet.

12. A fluid-filled cylindrical elastic mount containing a highly viscous fluid, comprising:

an inner sleeve and an outer sleeve which are radially spaced apart from each other;

an elastic body interposed between said inner and outer sleeves, for elastically connecting the inner and outer sleeves, said elastic body having a pair of pockets formed on opposite sides of said inner sleeve and opposed to each other in one diametral direction of the mount in which a vibrational load is applied, said pockets being closed by said outer sleeve so as to provide a pair of fluid chambers which contain said highly viscous fluid, said elastic body further having at least one groove formed between corresponding circumferential ends of said pair of pockets, said at least one groove being closed by said outer sleeve so as to provide a fluid passage which communicates with said pair of fluid chambers;

an intermediate sleeve interposed between said elastic body and said outer sleeve, and having a pair of windows aligned with said pair of pockets, respectively, said intermediate sleeve further having a first cut formed in a circumferential portion thereof between one of opposite circumferential ends of one of said pair of windows and a corresponding circumferential end of the other of the windows;

a sealing rubber layer formed on an outer circumferential surface of said intermediate sleeve, including a second cut which extends from an outer surface thereof to an outer surface of said intermediate sleeve and which is aligned with said first cut;

said outer sleeve having at least one inlet for injecting said highly viscous fluid into said pair of fluid chambers;

a pair of restricting protrusions which are respectively formed in said pair of fluid chambers, so as to protrude from said inner sleeve toward said outer sleeve in radially opposite directions parallel to said one diametral direction, each of said restricting protrusions having a radial end face which cooperates with said outer sleeve to define a restricted portion which has a predetermined radial dimension; and at least one sealing member fixed to said outer sleeve for closing said at least one inlet.

\* \* \* \* \*